United States Patent
Snapp et al.

(10) Patent No.: US 8,280,362 B2
(45) Date of Patent: Oct. 2, 2012

(54) SYSTEM AND METHOD FOR CONTROLLING A FEATURE OF A MOBILE COMMUNICATION UNIT

(75) Inventors: John Lawrence Snapp, Westminster, CO (US); Robin Erkkila, Lafayette, CO (US); Mary A. Boyd, Comanche, TX (US)

(73) Assignee: West Corporation, Omaha, NE (US)

( * ) Notice: Subject to any disclaimer, the term of this patent is extended or adjusted under 35 U.S.C. 154(b) by 964 days.

(21) Appl. No.: 12/128,052

(22) Filed: May 28, 2008

(65) Prior Publication Data
US 2009/0298488 A1  Dec. 3, 2009

(51) Int. Cl. *H04M 3/00* (2006.01)
(52) U.S. Cl. ........................ 455/418; 455/425
(58) Field of Classification Search ............... 455/412.1, 455/412.2, 414.1, 418, 421, 425
See application file for complete search history.

(56) References Cited

U.S. PATENT DOCUMENTS

| | | |
|---|---|---|
| 6,992,580 B2 | 1/2006 | Kotzin et al. |
| 7,027,808 B2 | 4/2006 | Wesby |
| 7,043,263 B2 | 5/2006 | Kaplan et al. |
| 7,317,699 B2 | 1/2008 | Godfrey et al. |
| 7,323,970 B1 | 1/2008 | Murray et al. |
| 2002/0061754 A1 | 5/2002 | Takano |
| 2003/0109246 A1 | 6/2003 | Shimizu |
| 2006/0205394 A1 | 9/2006 | Vesterinen |
| 2007/0116327 A1 | 5/2007 | Breed et al. |
| 2007/0185980 A1 | 8/2007 | Abraham |
| 2007/0233388 A1 | 10/2007 | Johnson |
| 2007/0276587 A1 | 11/2007 | Johnson |
| 2008/0004002 A1* | 1/2008 | Chin et al. ............. 455/425 |
| 2008/0030308 A1 | 2/2008 | Johnson |
| 2008/0030588 A1 | 2/2008 | Boss et al. |
| 2008/0032665 A1 | 2/2008 | Bergstrom |
| 2008/0036580 A1 | 2/2008 | Breed |
| 2010/0094583 A1* | 4/2010 | Borean et al. ........... 702/142 |

FOREIGN PATENT DOCUMENTS

| | | |
|---|---|---|
| EP | 1589727 A | 10/2005 |
| WO | WO2006125992 A | 11/2006 |

* cited by examiner

*Primary Examiner* — Sam Bhattacharya

(57) ABSTRACT

A system for controlling at least one feature of at least one mobile communication unit includes: At least one sensor unit coupled with the at least one mobile communication unit. The at least one sensor unit senses at least one parameter associated with the at least one mobile communication unit. Each respective sensor unit of the at least one sensor unit presents a respective indicator relating to a respective sensed parameter of the at least one parameter. The system also includes at least one feature management system coupled with the at least one sensor unit. The at least one feature management system receives a representation of each respective indicator. The at least one feature management system employs the representation in cooperation with the at least one mobile communication unit to effect the controlling.

20 Claims, 3 Drawing Sheets

SYSTEM AND METHOD FOR CONTROLLING A FEATURE OF A MOBILE COMMUNICATION UNIT

FIELD OF THE INVENTION

The present invention is directed to telecommunication systems, and especially to controlling or altering features of mobile communication units depending upon sensed parameters associated with the mobile communication units.

BACKGROUND OF THE INVENTION

There are circumstances in which one may wish to alter or control features of a mobile communication unit such as, by way of example and not by way of limitation, mobile phones. By way of further example and not by way of limitation, one may wish to limit or block a capability to engage in Short Message Service (SMS) communications, sometimes referred to as texting, while a mobile phone is in a moving vehicle. Such limiting of features available to a mobile communication unit may improve safety for a user of the mobile communication unit.

Other examples may include curtailing or blocking ring tones while a mobile phone is in certain locations such as, by way of example and not by way of limitation, a movie theater, a school, a hospital, a church or another location where a ringing phone may be disruptive.

A system or method for controlling features of a mobile communication unit may be implemented using sensors connected with the mobile communication unit being controlled, using sensors coupled with a network serving the mobile communication unit, or using a combination of mobile and immobile sensors connected directly with the mobile communication unit and coupled with the mobile communication unit via a network.

It may be useful for a method and system for controlling a feature of a mobile communication unit to ensure that an emergency calling capability, such as emergency 9-1-1 calling capability or feature, is available to the mobile communication unit at all times regardless of information indicated by sensors.

Automatic sensing of circumstances in which a feature or features may be limited or curtailed for a mobile communication unit may be desirable because users are not always attentive to circumstances, are not always safety-minded when using a mobile communicate unit and are not always considerate in using a mobile communication unit.

There is a need for a system and method for controlling features of a mobile communication unit depending upon circumstances sensed in connection with the mobile communication unit.

SUMMARY OF THE INVENTION

A system for controlling at least one feature of at least one mobile communication unit includes: At least one sensor unit coupled with the at least one mobile communication unit. The at least one sensor unit senses at least one parameter associated with the at least one mobile communication unit. Each respective sensor unit of the at least one sensor unit presents a respective indicator relating to a respective sensed parameter of the at least one parameter. The system also includes at least one feature management system coupled with the at least one sensor unit. The at least one feature management system receives a representation of each respective indicator. The at least one feature management system employs the representation in cooperation with the at least one mobile communication unit to effect the controlling.

A method for controlling at least one feature of at least one mobile communication unit; the method including: (a) in no particular order: (1) providing at least one sensor unit; and (2) providing at least one feature management system; (b) in no particular order: (1) coupling the at least one sensor unit with the at least one mobile communication unit; and (2) coupling the at least one feature management system with the at least one sensor unit; (c) operating the at least one sensor unit to sense at least one parameter associated with the at least one mobile communication unit and to present a respective indicator relating to a respective sensed parameter of the at least one parameter; (d) operating the at least one feature management system to receive a representation of each the respective indicator; and (e) operating the at least one feature management system cooperatively with the at least one mobile communication unit to employ the representation to effect the controlling.

It is, therefore a feature of the present invention to provide a system and method for controlling features of a mobile communication unit depending upon circumstances sensed in connection with the mobile communication unit.

Further features of the present invention will be apparent from the following specification and claims when considered in connection with the accompanying drawings, in which like elements are labeled using like reference numerals in the various figures, illustrating the preferred embodiments of the invention.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

When the terms "coupled" and "connected", along with their derivatives, are used herein, it should be understood that these terms are not intended as synonyms for each other. Rather, in particular embodiments, "connected" is used to indicate that two or more elements are in direct physical or electrical contact with each other. "Coupled" is used to indicated that two or more elements are in either direct or indirect (with other intervening elements between them) physical or electrical contact with each other, or that the two or more elements co-operate or interact with each other (e.g., as in a cause-and-effect relationship).

Figure 1:
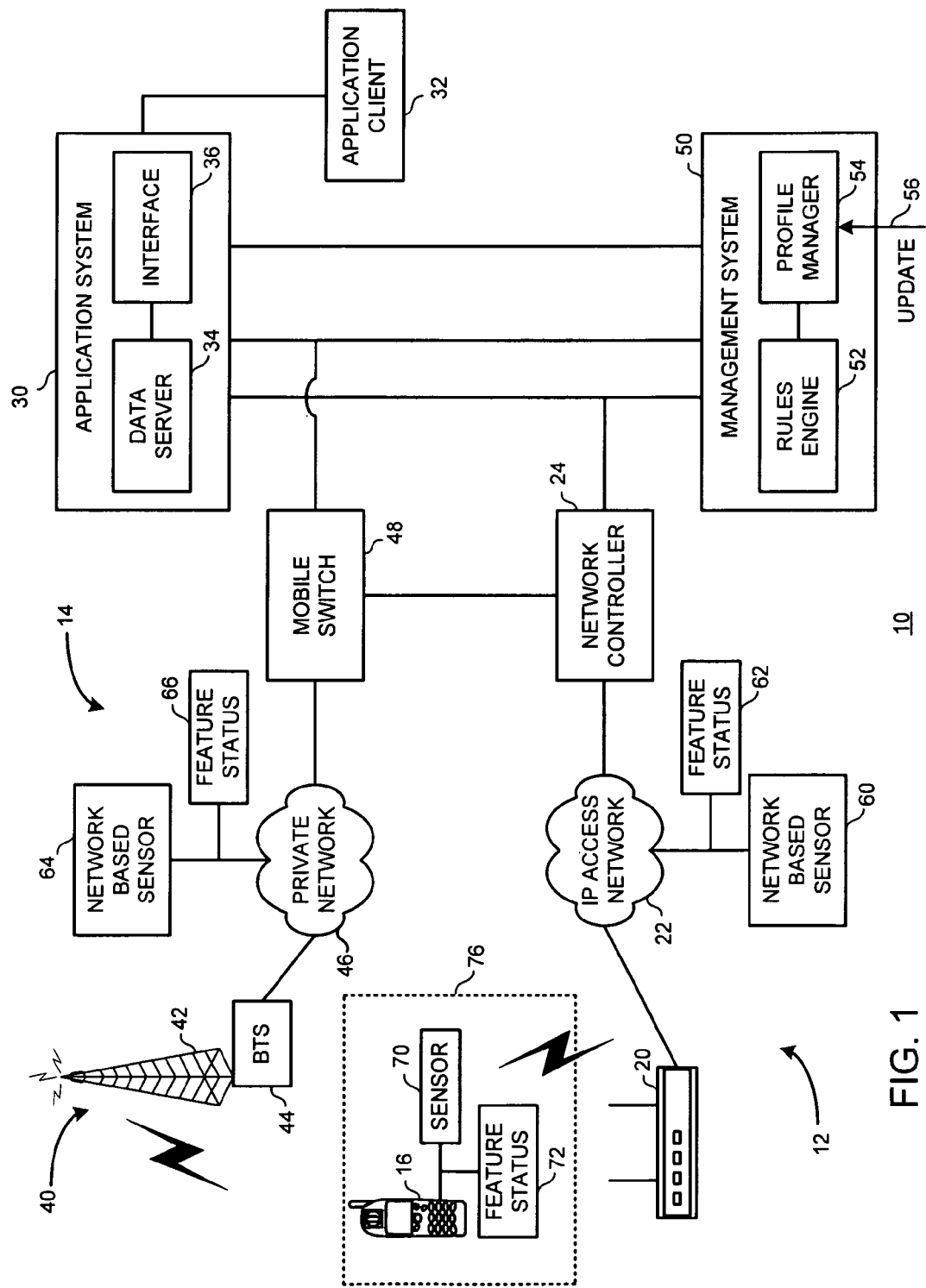
FIG. 1 is a schematic diagram illustrating a system for system and method for controlling features of a mobile communication unit depending upon circumstances sensed in connection with the mobile communication unit.

FIG. 1 is a schematic diagram illustrating a system for system and method for controlling features of a mobile communication unit depending upon circumstances sensed in connection with the mobile communication unit. In FIG. 1, a telecommunication system 10 includes an Unlicensed Mobile Access (UMA) Network (UMAN) 12 and a Radio Access Network (RAN) 14. UMAN 12 may be embodied in, by way of example and not by way of limitation, a Wi-Fi network, a Bluetooth network or another type of UMA. RAN 14 may be embodied in, by way of example and not by way of limitation, a cellular network or a Personal Communication System (PCS) network employing any of several communication protocols including, by way of further example and not by way of limitation, Advanced Mobile Phone Service (AMPS), GSM (Groupe Speciale Mobile, or Global System for Mobile communications) or another protocol using Time Division Multiple Access (TDMA), Code Division Multiple Access (CDMA) or another coding scheme. UMAN 12 and RAN 14 are configured for wireless communication with a wireless calling unit or instrument 16.

UMAN 12 includes an access unit 20 coupled with an Internet Protocol (IP) access network 22. Access unit 20 facilitates communication between wireless communicating unit 16 and IP access network 22. IP access network 22 is coupled with a UMA Network Controller (UNC) or other network controller 24. Network controller 24 is coupled with an application system 30. Application system 30 may be embodied, by way of example and not by way of limitation, in a communication network or an IP access network or another interface appropriate for communicating calls with an application client 32. Application client 32 may be embodied, by way of example and not by way of limitation, in an answering center such as a Public Safety Answering Point (PSAP; sometimes referred to as a Public Safety Answering Position). Application system 30 may include a data server 34 and an interface unit 36 for carrying out communicating calls with application client 32. Details of application system 30, data server 34 and interface unit 36 are not discussed herein as those elements are within the understanding of one skilled in the art of telecommunication system design.

RAN 14 includes an access unit 40 that includes a radio antenna embodied in a radio tower 42 and a Base Transceiver Station (BTS) 44 coupled with radio tower 42. BTS 44 is coupled with a private network 46. Private network 46 may be embodied in, by way of example and not by way of limitation, a cellular network or a PCS network employing any of several communication protocols including, by way of further example and not by way of limitation, Advanced Mobile Phone Service (AMPS), GSM or another protocol using Time Division Multiple Access (TDMA), Code Division Multiple Access (CDMA) or another coding scheme. Access unit 40 facilitates communication between wireless communicating unit 16 and private network 46. Private network 46 is coupled with a mobile switch 48. Mobile switch 48 may be embodied, by way of example and not by way of limitation, in a Mobile Switching Center (MSC). Mobile switch 48 is coupled with application system 30 and with network controller 24.

Network controller 24 and mobile switch 48 are also coupled with a management system 50. Management system 50 includes a rules engine 52 for providing predetermined rules pertaining to which features of mobile communication unit 16 should be affected and how the features should be affected in response to conditions sensed relating to mobile communication unit 16. Management system 50 also includes a profile manager unit 54 for storing parameters relating to management of management system 50 generally and management of rules engine 52 in particular. A communications or update port 56 is provided for profile manager unit 56 to permit changing entries in profile manager unit 56 or rules engine 52 if desired. Management system 50 is coupled with mobile communication unit 16 via network controller 24, IP access network 22 and access unit 20. Alternately (or additionally) management system 50 may be coupled with mobile communication unit 16 via mobile switch 48, private network 46 and access unit 40.

A network based sensor unit 60 and associated feature status store 62 are oriented for coupling with mobile communication unit 16 via IP access network 22 and access unit 20. Network based sensor 60 may ascertain certain parameters relating to mobile communication unit 16 such as, by way of example and not by way of limitation, location based upon locus of access unit 20, motion by mobile communication unit 16 and other parameters.

A network based sensor unit 64 and associated feature status store 66 are oriented for coupling with mobile communication unit 16 via private network 46 and access unit 40. Network based sensor 64 may ascertain certain parameters relating to mobile communication unit 16 such as, by way of example and not by way of limitation, location based upon cell and sector serving mobile communication unit 16 via access unit 40, motion by mobile communication unit 16 and other parameters.

A mobile local sensor unit 70 and associated feature status store 72 are connected with mobile communication unit 16. Mobile local sensor 70 may ascertain certain parameters relating to mobile communication unit 16 such as, by way of example and not by way of limitation, location based upon GPS (Global Positioning System); motion by mobile communication unit 16 as indicated by an accelerometer device (not shown in FIG. 1; understood by those skilled in the art of sensing apparatuses); temperature, humidity or other environmental parameters in the vicinity of mobile communication unit 16 and other parameters.

Mobile local sensor 70 may also be capable of linking with other sensors in the vicinity of mobile communication unit 16 (not shown in FIG. 1), such as linking via a Bluetooth local wireless connection or link with a sensor installed in an automobile in which mobile communication unit 16 is traveling. Such a local wireless link may permit additional inputs for use with mobile local sensor 70 such as, by way of example and not by way of limitation, which seats are occupied in an automobile in which mobile communication unit 16 is traveling.

One or more of sensors 60, 64, 70 may sense one or more parameters associated with mobile communication unit 16 and convey a representation or indicator of the sensed parameters to management system 50. Management system 50 may employ the received representation of the sensed parameter using rules engine 52 or profile manager 54 (or both) to cooperate with mobile communication unit 16 to control at least one feature of mobile communication unit 16.

Management system 50 may perform the cooperation with mobile communication unit 16, as described above, or management system 50 may download pertinent updated rules or criteria to mobile communication unit 16 for local use by mobile communication unit 16 in response to parameters sensed by one or more of sensors 60, 64, 70. Cooperation, downloading and other actions performed in concert by management system 50 and sensors 60, 64, 70 with mobile communication unit 16 may be effected via UMAN 12 or RAN 14.

By way of example and not by way of limitation, if one or more of sensors 60, 64, 70 detects that mobile communication unit 16 is traveling at a speed greater than a predetermined threshold speed, system 10 may presume (in accordance with rules contained in rules engine 52) that mobile communication system 16 is traveling in an automobile. As a result, management system 50 may cooperate with mobile communication unit 16 to disable a texting feature of mobile communication unit 16, except for texting to 9-1-1 (emergency service communications number). A local link by mobile communication unit 16 with the automobile in which mobile communication unit 16 is traveling may be employed to confirm that mobile communication unit 16 is indeed within an automobile, and that no passenger seat of the automobile is occupied.

By way of further example and not by way of limitation, system 10 may be linked via telephone or otherwise to a building locale 76, such as a movie theater, having subscribed to a service that permits building locale 76 to use UMAN 12 present a signal or otherwise communicate with mobile communication unit 16 to confirm entrance of mobile communication unit 16 within building locale 76. The subscription service may alert management system 50 of that circumstance via one or more of several communication means including, by way of example and not by way of limitation, land line telephone, UMAN 12 or RAN 14. Management system 50 may cooperate with mobile communicate unit 16 via system 10 to silence the ringer of mobile communication unit 16 or otherwise affect features or capabilities of mobile communication unit 16 so long as mobile communication unit 16 remains within building locale 76.

Figure 2:
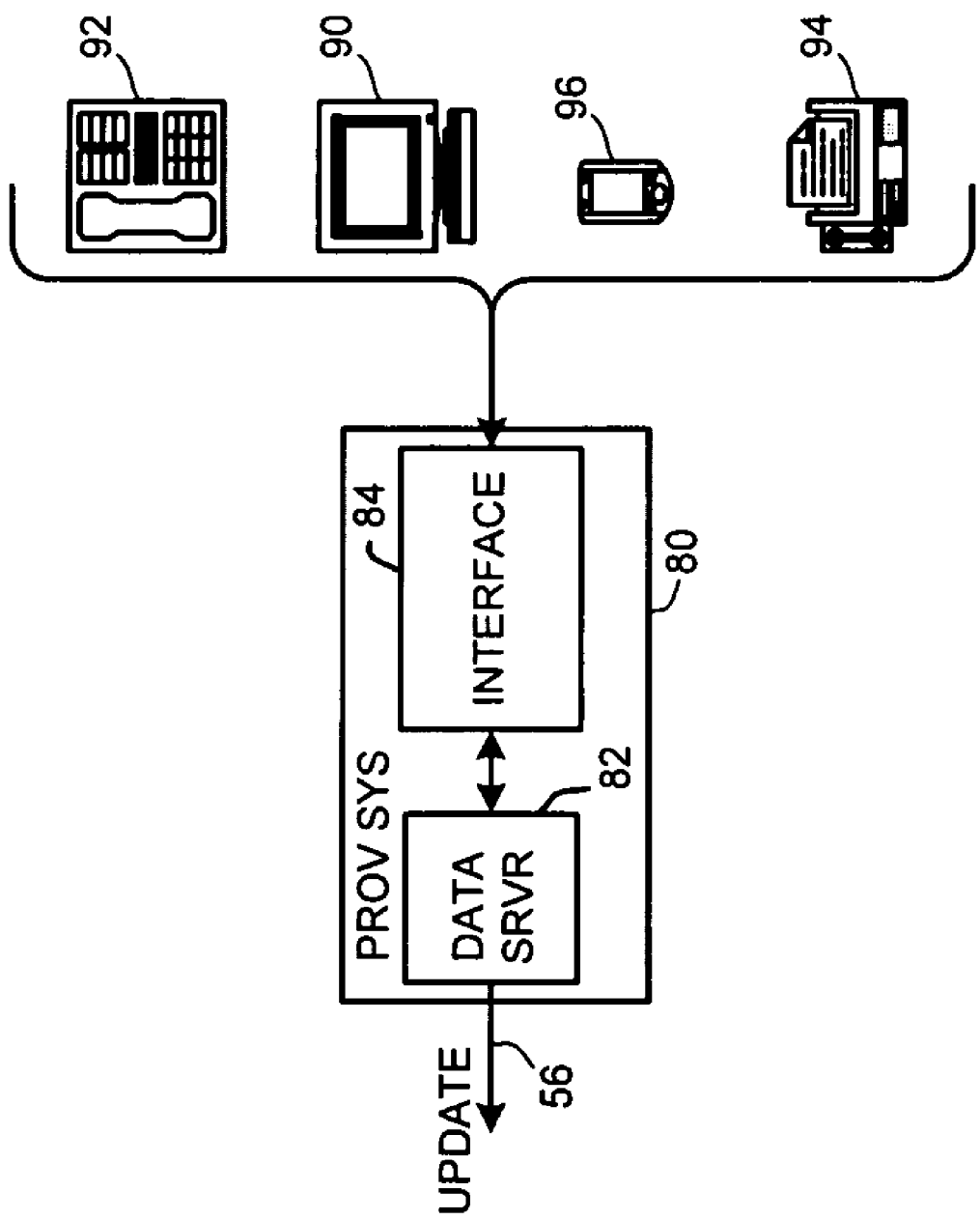
FIG. 2 is a schematic diagram illustrating various ways that the profile manager unit illustrated in FIG. 1 may be updated.

FIG. 2 is a schematic diagram illustrating various ways that the profile manager unit illustrated in FIG. 1 may be updated. In FIG. 2, a provisioning system 80 is configured for updating information in management system 50. Provisioning system 80 includes a data server unit 82 coupled with an interface unit 84.

Provisioning system 80 is coupled with a communications or update port 56 associated with management system 50 (FIG. 1). Profile manager 54 (FIG. 1) can be updated for operating management system 50 based on preferences set up by a home or business subscriber and submitted to provisioning system 80 via interface unit 84 by any of various technologies known to those skilled in the art of telecommunication system design including, by way of example and not by way of limitation, a computer 90, a phone 92, a facsimile machine 94 and a PDA (Personal Digital Assistant) 96 or another communication device such as, by way of example and not by way of limitation, a smart phone (not shown in FIG. 2).

Figure 3:
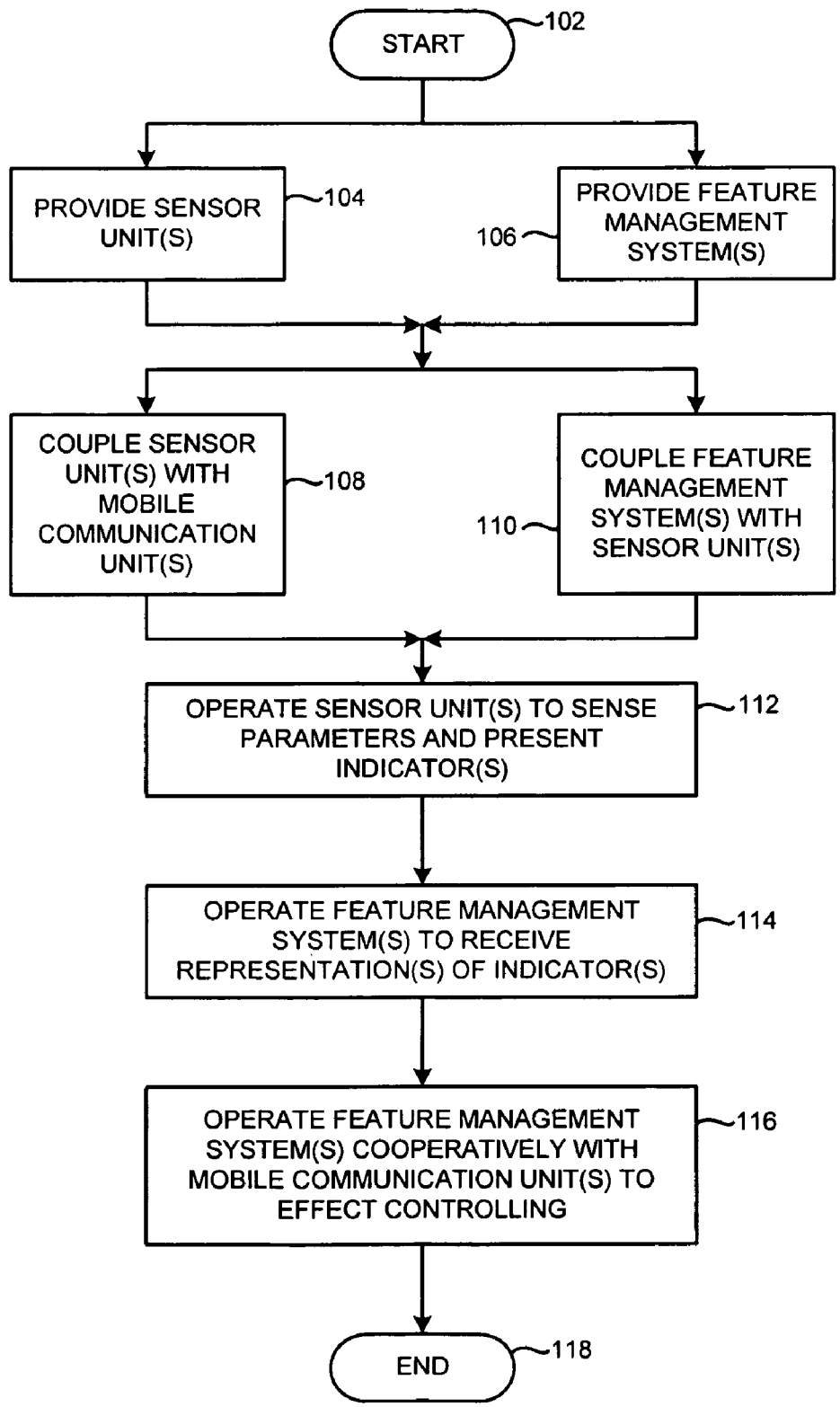
FIG. 3 is a flow diagram illustrating a method for controlling features of a mobile communication unit depending upon circumstances sensed in connection with the mobile communication unit.

FIG. 3 is a flow diagram illustrating a method for controlling features of a mobile communication unit depending upon circumstances sensed in connection with the mobile communication unit. In FIG. 3, a method 100 for controlling at least one feature of at least one mobile communication unit begins at a START locus 102.

Method 100 continues with, in no particular order: (1) providing at least one sensor unit, as indicated by a block 104; and (2) providing at least one feature management system, as indicated by a block 106.

Method 100 continues with, in no particular order: (1) coupling the at least one sensor unit with the at least one mobile communication unit, as indicated by a block 108; and (2) coupling the at least one feature management system with the at least one sensor unit, as indicated by a block 110.

Method 100 continues with operating the at least one sensor unit to sense at least one parameter associated with the at least one mobile communication unit and to present a respective indicator relating to a respective sensed parameter of the at least one parameter, as indicated by a block 112.

Method 100 continues with operating the at least one feature management system to receive a representation of each respective indicator, as indicated by a block 114.

Method 100 continues with operating the at least one feature management system cooperatively with the at least one mobile communication unit to employ the representation to effect the controlling, as indicated by a block 116.

Method 100 terminates at an END locus 118.

It is to be understood that, while the detailed drawings and specific examples given describe embodiments of the invention, they are for the purpose of illustration only, that the system and method of the invention are not limited to the precise details and conditions disclosed and that various changes may be made therein without departing from the spirit of the invention which is defined by the following claims:

The invention claimed is:

1. A system for controlling at least one feature of a respective mobile communication unit in a telecommunication system; the system for controlling comprising:
   (a) at least one sensor unit; said at least one sensor unit being coupled with said respective mobile communication unit; said respective mobile communication unit being configured for effecting two-way communication with a called station in said telecommunication system; said at least one sensor unit sensing at least one parameter associated with an environment in which said respective mobile communication unit is operating; each respective sensor unit of said at least one sensor unit presenting a respective indicator relating to a respective sensed parameter of said at least one parameter; and
   (b) at least one feature management system coupled with said at least one sensor unit; said at least one feature management system receiving a representation of each said respective indicator; said at least one feature management system employing said representation in cooperation with said respective mobile communication unit to effect said controlling said at least one feature only for said respective mobile communication unit.

2. A system for controlling at least one feature of a respective mobile communication unit in a telecommunication system as recited in claim 1 wherein said at least one sensor unit includes at least one local sensor unit;
   each respective local sensor unit of said at least one local sensor unit being connected for traveling with said respective mobile communication unit.

3. A system for controlling at least one feature of a respective mobile communication unit in a telecommunication system as recited in claim 1 wherein said at least one sensor unit includes at least one network-based sensor unit; said at least one network based sensor unit being coupled with said respective mobile communication unit via a respective network.

4. A system for controlling at least one feature of a respective mobile communication unit in a telecommunication system unit as recited in claim 1 wherein said at least one feature management system is substantially immobile.

5. A system for controlling at least one feature of a respective mobile communication unit in a telecommunication system as recited in claim 1 wherein said at least one feature management system includes at least one first feature management unit and at least one second feature management unit; said at least one first feature management unit being substantially immobile; each respective second feature management unit of said at least one second feature management unit being connected with said respective mobile communication unit.

6. A system for controlling at least one feature of a respective mobile communication unit in a telecommunication system as recited in claim 2 wherein said at least one sensor unit includes at least one network-based sensor unit; said at least one network based sensor unit being coupled with said respective mobile communication unit via a respective network.

7. A system for controlling at least one feature of a respective mobile communication unit in a telecommunication system as recited in claim 1 wherein said at least one feature management system is substantially immobile.

8. A system for controlling at least one feature of a respective mobile communication unit in a telecommunication system as recited in claim 3 wherein said at least one feature management system includes at least one first feature management unit and at least one second feature management unit; said at least one first feature management unit being substantially immobile; each respective second feature management unit of said at least one second feature management unit being connected with said respective mobile communication unit.

9. A system for affecting operation of a mobile communication unit in a telecommunication system; the system for affecting operation comprising:
(a) at least one sensor unit coupled with said mobile communication unit; said at least one sensor unit sensing at least one parameter associated with said mobile communication unit; said mobile communication unit being configured for effecting two-way communication with a called station in said telecommunication system; each respective sensor unit of said at least one sensor unit presenting a respective indicator relating to a respective sensed parameter of said at least one parameter; and
(b) at least one feature management system coupled with said at least one sensor unit; said at least one feature management system receiving a representation of each said respective indicator; said at least one feature management system employing said representation in cooperation with said mobile communication unit to effect said affecting said operation only for said mobile communication unit.

10. A system for affecting operation of a mobile communication unit in a telecommunication system as recited in claim 9 wherein said at least one sensor unit includes at least one local sensor unit; each respective local sensor unit of said at least one local sensor unit being connected for traveling with said mobile communication unit.

11. A system for affecting operation of a mobile communication unit in a telecommunication system as recited in claim 9 wherein said at least one sensor unit includes at least one network-based sensor unit; said at least one network based sensor unit being coupled with said mobile communication unit via at least one network.

12. A system for affecting operation of a mobile communication unit in a telecommunication system as recited in claim 9 wherein said at least one feature management system is substantially immobile.

13. A system for affecting operation of a mobile communication unit in a telecommunication system as recited in claim 9 wherein said at least one feature management system includes at least one first feature management unit and a second feature management unit; said at least one first feature management unit being substantially immobile; said second feature management unit being connected with said mobile communication unit.

14. A system for affecting operation of a mobile communication unit in a telecommunication system as recited in claim 10 wherein said at least one sensor unit includes at least one network-based sensor unit; said at least one network based sensor unit being coupled with said mobile communication unit via at least one network.

15. A system for affecting operation of a mobile communication unit in a telecommunication system as recited in claim 9 wherein said at least one feature management system is substantially immobile.

16. A system for affecting operation of a mobile communication unit in a telecommunication system as recited in claim 11 wherein said at least one feature management system includes at least one first feature management unit and a second feature management unit; said at least one first feature management unit being substantially immobile; said second feature management unit being connected with said mobile communication unit.

17. A method for controlling at least one feature of a respective mobile communication unit in a telecommunication system; the method for controlling comprising:
(a) in no particular order:
(1) providing at least one sensor unit; and
(2) providing at least one feature management system;
(b) in no particular order:
(1) coupling said at least one sensor unit with said respective mobile communication unit; said respective mobile communication unit being configured for effecting two-way communication with a called station in said telecommunication system; and
(2) coupling said at least one feature management system with said at least one sensor unit;
(c) operating said at least one sensor unit to sense at least one parameter associated with an environment in which said respective mobile communication unit is operating and to present a respective indicator relating to a respective sensed parameter of said at least one parameter;
(d) operating said at least one feature management system to receive a representation of each said respective indicator; and
(e) operating said at least one feature management system cooperatively with said respective mobile communication unit to employ said representation to effect said controlling said at least one feature only for said respective mobile communication unit.

18. A method for controlling at least one feature of a respective mobile communication unit in a telecommunication system as recited in claim 17 wherein said at least one sensor unit includes at least one local sensor unit;
each respective local sensor unit of said at least one local sensor unit being connected for traveling with said respective mobile communication unit.

19. A method for controlling at least one feature of a respective mobile communication unit in a telecommunication system as recited in claim 18 wherein said at least one sensor unit includes at least one network-based sensor unit; said at least one network based sensor unit being coupled with said respective mobile communication unit via a respective network.

20. A method for controlling at least one feature of a respective mobile communication unit in a telecommunication system as recited in claim 19 wherein said at least one feature management system includes at least one first feature management unit and at least one second feature management unit; said at least one first feature management unit being substantially immobile; each respective second feature management unit of said at least one second feature management unit being connected with said respective mobile communication unit.

* * * * *